(12) United States Patent
Lachenmaier et al.

(10) Patent No.: US 9,869,256 B2
(45) Date of Patent: Jan. 16, 2018

(54) METHOD FOR DETECTING AND DESCRIBING A TRANSIENT DRIVING SITUATION

(71) Applicant: Robert Bosch GmbH, Stuttgart (DE)

(72) Inventors: Sebastian Lachenmaier, Stuttgart (DE); Johannes Zeller, Stuttgart (DE); Michael Bachner, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 226 days.

(21) Appl. No.: 14/830,384

(22) Filed: Aug. 19, 2015

(65) Prior Publication Data

US 2016/0076476 A1 Mar. 17, 2016

(30) Foreign Application Priority Data

Sep. 11, 2014 (DE) .................. 10 2014 218 221

(51) Int. Cl.

| *F02D 23/00* | (2006.01) |
|---|---|
| *F02D 21/08* | (2006.01) |
| *F02D 41/04* | (2006.01) |
| *F02D 41/00* | (2006.01) |
| *F02D 41/10* | (2006.01) |
| *F02D 41/14* | (2006.01) |
| *F02D 41/24* | (2006.01) |

(Continued)

(52) U.S. Cl.
CPC ......... *F02D 21/08* (2013.01); *F02D 41/0007* (2013.01); *F02D 41/045* (2013.01); *F02B 37/12* (2013.01); *F02D 41/10* (2013.01); *F02D 41/1401* (2013.01); *F02D 41/2416* (2013.01); *F02D 2041/1432* (2013.01); *F02D 2200/0406* (2013.01); *F02D 2200/0614* (2013.01); *F02D 2200/101* (2013.01); *F02D 2200/70* (2013.01); *F02M 26/05* (2016.02); *Y02T 10/144* (2013.01)

(58) Field of Classification Search
CPC .... F02D 21/08; F02D 2021/083; F02D 23/00; F02D 23/02; F02D 2200/0406; F02D 2200/0408; F02D 2250/36; F02D 41/0007; F02D 41/0047; F02D 41/005; F02D 41/045; F02D 41/10; F02M 26/02–26/05; F02M 26/08; F02M 26/10
USPC ........................ 701/108; 123/568.19, 568.21
See application file for complete search history.

(56) References Cited

U.S. PATENT DOCUMENTS 5,003,950 A * 4/1991 Kato .................. F02D 41/045
123/406.46
6,095,127 A * 8/2000 Kolmanovsky ..... F02D 41/0072
123/480

(Continued)

FOREIGN PATENT DOCUMENTS

| DE | 41 07 693 | 9/1992 |
|---|---|---|
| DE | 100 10 978 | 9/2001 |
| JP | 2004 092471 | * 3/2004 |

*Primary Examiner* — Erick Solis
(74) *Attorney, Agent, or Firm* — Norton Rose Fulbright US LLP; Gerard Messina

(57) ABSTRACT

A method for detecting and describing a transient driving situation of a motor vehicle having an internal combustion engine having a boost pressure control system or intake manifold pressure control system, wherein an indicator for identifying the transient driving situation is determined from a relative boost pressure/intake manifold pressure control deviation.

18 Claims, 2 Drawing Sheets

(51) Int. Cl.
F02M 26/05 (2016.01)
F02B 37/12 (2006.01)

(56) References Cited

U.S. PATENT DOCUMENTS

| | | | | |
|---|---|---|---|---|
| 8,256,217 B2* | 9/2012 | Inoue | ............... | F02D 41/045 |
| | | | | 123/492 |
| 8,666,637 B2* | 3/2014 | Glugla | ............... | F02D 41/22 |
| | | | | 123/406.13 |
| 9,175,629 B2* | 11/2015 | Cunningham | ........ | F02D 41/006 |
| 9,316,147 B2* | 4/2016 | Wang | ............... | F02B 37/186 |
| 2006/0266033 A1* | 11/2006 | Negishi | ............ | F02D 41/0007 |
| | | | | 60/602 |
| 2011/0067395 A1* | 3/2011 | Suhocki | ............. | F02B 33/36 |
| | | | | 60/602 |
| 2014/0013742 A1* | 1/2014 | Mizuno | ............... | F02B 37/10 |
| | | | | 60/607 |
| 2015/0198106 A1* | 7/2015 | Ishibashi | ............ | F02D 23/02 |
| | | | | 123/445 |
| 2016/0237925 A1* | 8/2016 | Lee | ............... | F02D 41/0007 |

* cited by examiner

METHOD FOR DETECTING AND DESCRIBING A TRANSIENT DRIVING SITUATION

RELATED APPLICATION INFORMATION

The present application claims priority to and the benefit of German patent application no. 10 2014 218 221.2, which was filed in Germany on Sep. 11, 2014, the disclosure of which is incorporated herein by reference.

FIELD OF THE INVENTION

The present invention relates to a method for detecting and describing a transient driving situation. The present invention further relates to a computer program, a machine-readable data medium for storing the computer program, and an electronic control unit with which the method according to the present invention can be carried out.

BACKGROUND INFORMATION

In order to comply with ever more stringent limitations on pollutant emissions, a plurality of actions are taken in present-day engines in order to reduce, in particular, emissions of particulates and of nitrogen oxides.

One essential action is exhaust gas recirculation (EGR), which represents a present-day arrangement for preventing nitrogen oxide emissions. Exhaust gas recirculation lowers the oxygen content in the cylinder, and a decrease in the temperature in the combustion chamber consequently occurs. A rise in particulates with increasing exhaust gas recirculation is problematic. The principal reason for higher particulate emissions is that the oxygen also necessary for carbon oxidation is limited. The reduction in oxygen content caused by exhaust gas recirculation thus always has the effect of decreasing nitrogen oxide emissions, and elevating particulate emissions. This creates a conflict of objectives between particulate and nitrogen-oxide emissions, especially in diesel engines.

As a result of existing regulatory stipulations for the exhaust test cycle, the requirements for passenger cars regarding reduction of pollutant emissions in dynamic operation have been undemanding. In the commercial vehicle sector, dynamic operation has been entirely excluded by a steady-state test.

The development of exhaust gas recirculation control systems has therefore been directed essentially toward reducing emissions under steady-state conditions. The EGR control structure has therefore been based on values for engine speed and engine load that were identified under steady-state conditions and stored in characteristics diagrams. Control of air masses or EGR rates is known from known EGR control systems. Future regulatory requirements for commercial-vehicle and passenger-vehicle engines provide for a substantially larger dynamic component. In the future, certification will focus on emissions occurring in actual driving operation, e.g. in dynamic operation ("real driving emissions" or RDE), and on fuel consumption.

Taking dynamic processes into account requires, in particular, taking into account abrupt load changes and rapid load increases, such as those that often occur in real driving operation and in future test cycles. In a diesel engine, abrupt load changes and rapid load increases result, because of the inertia of the air system, in a delay in boost pressure buildup. The reasons for this inertia include the moment of inertia of the turbocharger and the dead volume between the compressor and the engine intake valves. The injection system that implements the driver's load demand has a considerably shorter reaction time than the engine's air system.

Because cylinder filling in a diesel engine is determined substantially by the slow-reacting boost pressure, the target values of the air system—based on injection volume and engine speed—are mismatched with the dynamic state of the engine. The steady-state target value of an air mass control system thus results, in the context of a slow-reacting boost pressure buildup and thus decreased cylinder filling, in a sharp reduction in the EGR rate, thereby producing dynamic nitrogen oxide spikes. With an EGR rate control system, the result is a smaller air mass and thus elevated particulate emissions. In systems or operating states dominated by high-pressure EGR, the resulting additional negative effect on boost pressure buildup potentially limits the maximum possible injection volume, with a consequent delay in reaching the desired target torque.

Patent document DE 100 10 978 A1 discusses a method for regulating the boost pressure of an internal combustion engine having an exhaust gas-driven turbocharger whose turbine, disposed in the exhaust duct of the internal combustion engine, has a modifiable geometry, regulation of the boost pressure being accomplished by way of an adjustment of the turbine geometry. In order to ensure boost regulation such that in the context of a load change, the boost pressure tracks as quickly as possible the change in the desired target boost pressure value, this method and this apparatus provide for determining a control variable for the turbine geometry from the system as a function of the exhaust backpressure existing in the exhaust duct in front of the turbine. This is because the exhaust backpressure reacts considerably more quickly than the boost pressure to a change in the behavior of the controlled system, e.g. to a load alternation, change in engine speed, change in exhaust gas recirculation, or to malfunctions, e.g. in the actuation system.

Patent document DE 41 07 693 A1 discusses a system for regulating and controlling a turbocharger, in which a predefined target value of the boost pressure is compared with an actual value. As a function of the comparison, a control system generates an actuating signal for applying control to an actuating mechanism. The target value depends at least on an engine speed signal and on a load signal. An arrangement is provided which elevates the boost pressure upon a specific change in the load signal.

The methods from the existing art for identifying target values for the control function are not sufficient to react, in the control loops for exhaust gas recirculation, turbocharging, and fuel injection, to the state of affairs described above in transient driving situations. In methods known from the existing art, transient driving situations of this kind are implemented, for example, by monitoring accelerator pedal gradients or injection volume gradients. The problem here is that these variables are not relevant in terms of preventing the generation of pollutant emissions.

Strictly in principle, it is also possible to use electric motors (e-machines) or electrical auxiliary compressors (e-boosters) to accelerate the buildup of boost pressure or torque. Here as well, a transient driving situation must be optimally detected.

SUMMARY OF THE INVENTION

The method according to the present invention for detecting and describing a transient driving situation of a motor vehicle having a boost pressure/intake manifold pressure control system makes it possible to furnish an indicator for describing a transient driving situation, on the basis of which indicator corrections can be made to target values for controlling exhaust gas recirculation, boost pressure/intake manifold pressure, and injection volume. This indicator can also be used as a trigger for applying control to an electrical auxiliary compressor or an e-machine. Provision is made according to the present invention that the indicator for identifying the transient driving situation is identified from a relative boost pressure/intake manifold pressure control deviation. The invention is based on the recognition that the boost pressure/intake manifold pressure control deviation represents a suitable indication for monitoring the total expected engine filling as compared with steady-state operation, and is furthermore suitable for more accurately quantifying associated changes in emissions behavior, which are in turn dependent on the downstream control concept for closed- or open-loop systems controlling the boost pressure/intake manifold pressure, EGR, or injection volume.

The invention proposes in particular that a relative deviation of a target value from an actual value of the boost pressure/intake manifold pressure control system, in terms of the present target value, be used as a relative boost pressure/intake manifold pressure control deviation. Empirical investigations have revealed that this value is a suitable indication for monitoring the total expected engine filling as compared with steady-state operation.

According to a very advantageous embodiment of the method, a dynamic indicator is determined from the relative boost pressure/intake manifold pressure control deviation and from a variable characterizing the engine speed, in particular by way of a two-dimensional characteristics diagram interpolation from a characteristics diagram encompassing the boost pressure/intake manifold pressure deviation and engine speed.

This dynamic indicator may be a dimensionless variable, in particular in the value range between 0 and 1.

In order to allow separate treatment of late phases of a transient load increase, and to allow a continuous transition to be achieved between steady-state target values and corrections based on the proposed dynamic indicator, provision can be made additionally to "smooth off" a trailing edge in the time course of the dynamic indicator using a low pass filter. This can be useful, for example, when a negative gradient is detected in the dynamic indicator, but a positive gradient is detected in the injection volume (i.e. a further load increase).

In order to allow special shaping of a reaction of the indicator, for example in the part-load range, according to an advantageous embodiment of the method provision can furthermore be made to use this filtration in specific injection-volume ranges.

The low pass filter is, in particular, which may be a PT1 filter having a present value of the indicator as an initial value and a volume-dependent or volume gradient-dependent time constant.

The value of the dynamic indicator, and its behavior over time, are also suitable for providing information about expected emissions deviations, including, in particular, as a function of the downstream control concept for closed- or open-loop systems controlling boost pressure/intake manifold pressure, EGR, or injection volume.

The method described above is utilized in vehicles having internal combustion engines having boost pressure/intake manifold pressure control systems. The invention is not limited thereto, however. For systems with exclusively pilot-controlled boost pressure, a comparison between the present boost pressure and a reference boost pressure, which in this case replaces the target boost pressure of the control system and takes into account the environmental corrections, can be utilized.

The computer program according to the present invention is configured to carry out each step of the method, in particular when it executes on a calculation device or a control unit. It enables implementation of the method according to the present invention on an electronic control unit with no need to make physical changes thereto. The machine-readable data medium on which the computer program is stored is provided for this purpose. Installing the computer program according to the present invention on an electronic control unit yields the electronic control unit according to the present invention, which is configured to control an internal combustion engine having a boost pressure/intake manifold pressure control system, or having an intake manifold pressure control system, using the method according to the present invention.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

DETAILED DESCRIPTION

Figure 1:
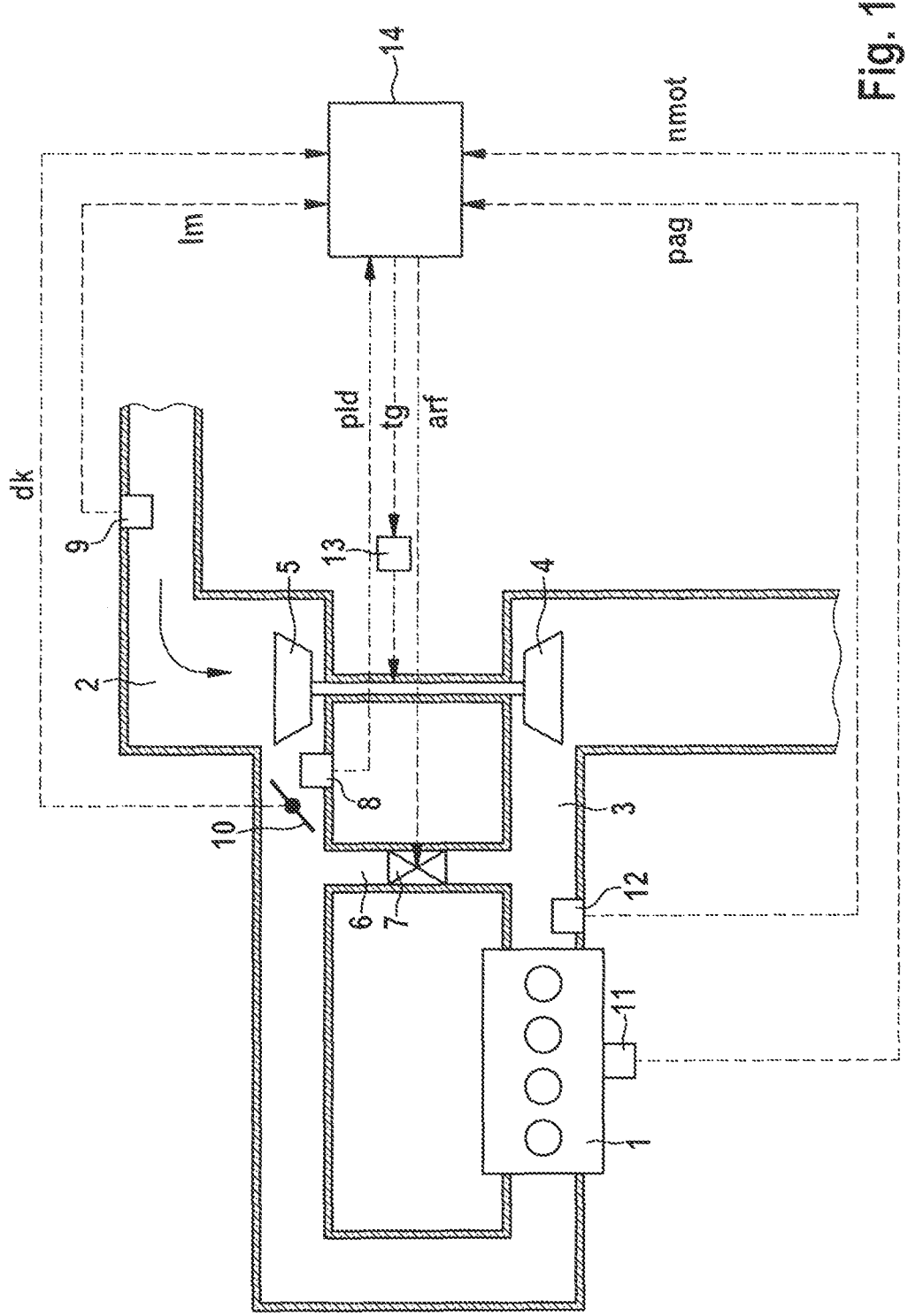
FIG. 1 schematically depicts an internal combustion engine, having an exhaust gas-driven turbocharger, in which the method according to the present invention is utilized.

FIG. 1 depicts an internal combustion engine 1 having an intake duct 2 and an exhaust duct 3. A turbine 4 of an exhaust gas-driven turbocharger is disposed in exhaust duct 3, and a compressor 5 thereof in intake duct 2. The internal combustion engine can be equipped, as depicted, with an exhaust gas recirculation duct 6 that connects exhaust duct 3 to intake manifold 2. An controllable valve 7 is disposed in exhaust gas recirculation duct 6. Control is applied to valve 7 by a control unit 14 that outputs a signal arf. A pressure sensor 8 for measuring the boost pressure is provided in intake manifold 2. The signal pld of boost pressure sensor 8 is delivered to control unit 14. Control unit 14 in turn controls, for example, the turbine geometry of the turbocharger. In order to control the turbine geometry of the turbocharger, control unit 14 outputs a signal tg to an actuating device 13 that adjusts the turbine geometry.

In addition, a signal dk that characterizes the position of a throttle valve 10 is also delivered to the engine control unit via a corresponding electrical lead. An air mass sensor 9, whose signals lm are likewise delivered to engine control unit 14, is also disposed in the intake manifold. A pressure sensor 12 is disposed in exhaust gas duct 3. This measures the exhaust gas pressure and likewise supplies to engine control unit 14 a signal pag characterizing that pressure. A sensor 11 senses the rotation speed of the internal combustion engine. This signal nmot is also delivered to engine control unit 14.

In order to detect and quantify a transient load increase in terms of its potential for increased production of pollutant emissions, a method is now provided that uses an indicator based on the relative deviation between a target value and an actual value of the boost pressure control system, in terms of the present target value. This value is a suitable indication for monitoring the total expected engine filling as compared with steady-state operation, and also provides information as to the expected emissions deviations that can occur depending on the downstream control concept for closed- or open-loop control systems for boost pressure, EGR, or injection volume. The invention will be described using the example of a boost pressure control system. The invention is not, however, limited thereto. It is to be emphasized expressly that the method according to the present invention can also be used with systems having an intake manifold pressure control system; what is determined and used in this case is the relative intake manifold pressure control deviation. In addition, the method can also be used with systems with exclusively pilot-controlled boost pressure, or in a system with no active boost pressure control. In this case a comparison between the present boost pressure and a reference boost pressure, which also takes into account environmental corrections, is utilized.

Figure 2:
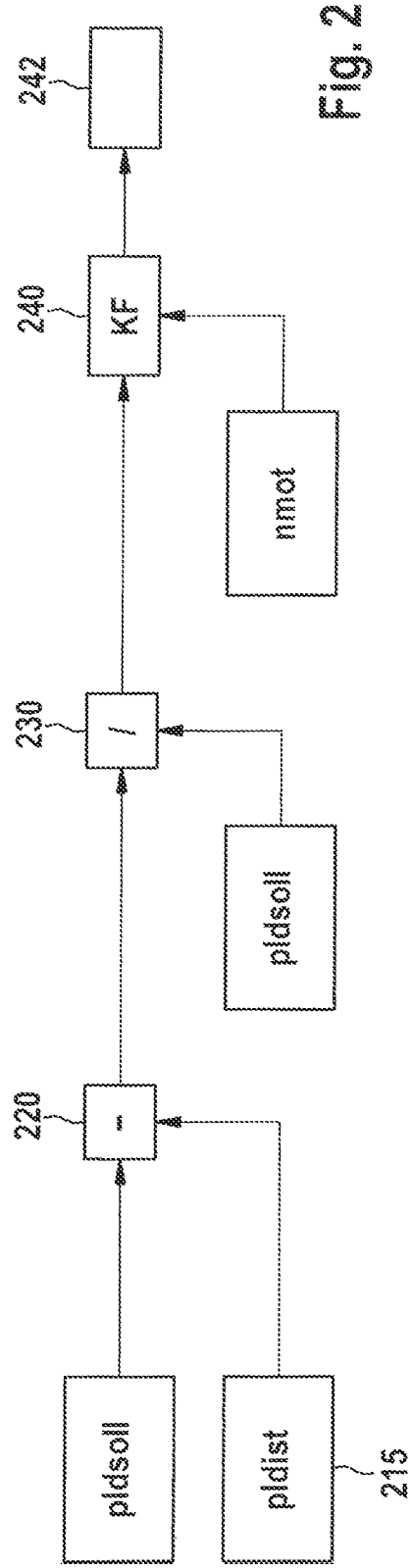
FIG. 2 is a block diagram to explain the method according to the present invention.
Figure 3:
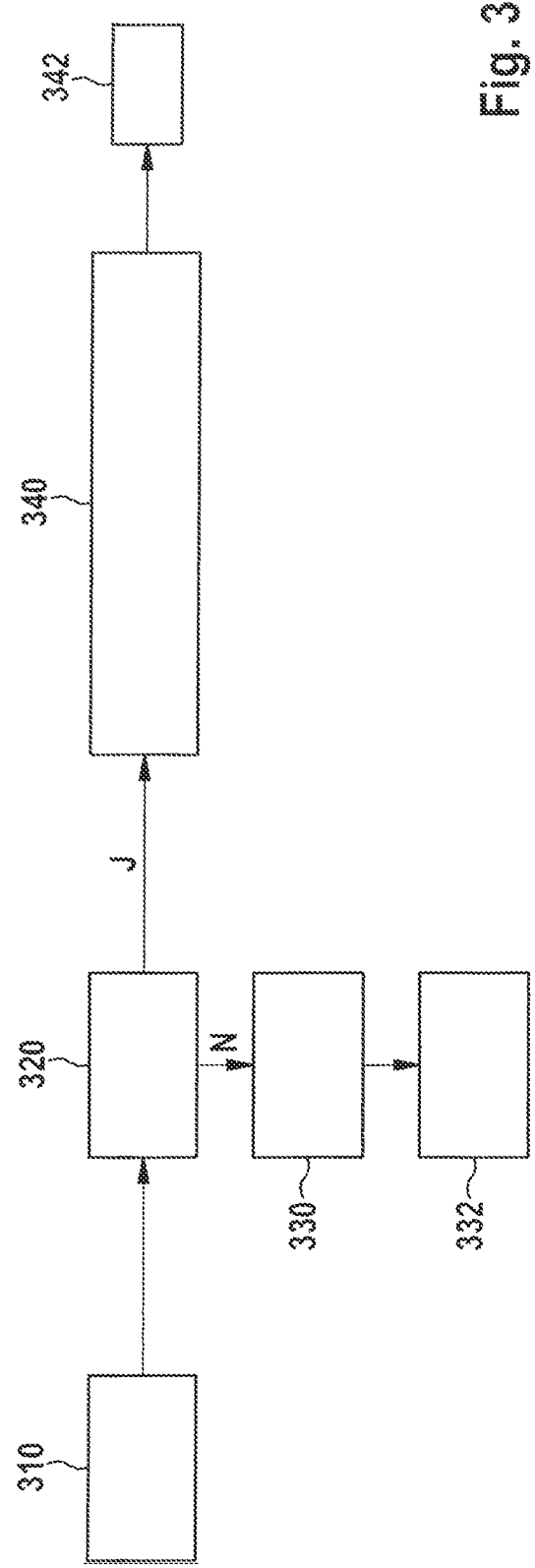
FIG. 3 is a block diagram depicting calculation of an indicator according to an embodiment of the method according to the present invention.

FIG. 2 is a schematic block diagram to explain the method according to the present invention. In a calculation step 220, the difference between the target boost pressure value pldsoll furnished by engine control unit 14, and the actual boost pressure value pldist sensed by sensor 8, is calculated. In a further calculation step 230 this difference is divided by the target boost pressure value pldsoll. The result is delivered, together with the engine speed nmot sensed by rotation speed sensor 12, to a characteristics diagram (KF) 240 in which an indicator is determined by two-dimensional characteristics diagram interpolation. The variable determined in characteristics diagram 240 is converted into a normalized dimensionless variable, typically in the value range between 0 and 1. This variable represents the dynamic indicator that is then, in step 242, delivered in turn to the EGR system or to the injection system controller. The engine speed nmot is used here because the mass gas flow through the engine (directly dependent on the engine speed) represents an important variable for characterizing the maximum achievable dynamics for boost pressure buildup, and different relative boost pressure deviations at different engine speeds nmot can thereby be handled differently.

The dynamic indicator can also be used for applying control, for example, to an electric motor (e-machine) or an electrical auxiliary compressor (e-booster) that is provided in order to accelerate the buildup of boost pressure and torque. In this case the dynamic indicator is used, so to speak, as a "trigger" for applying control to the electrical auxiliary compressor or e-machine. In the case of the auxiliary compressor, additional energy is made available for building up boost pressure, whereas when an e-machine is used, the load on the internal combustion engine can be decreased. This torque substitution also results in a transient reduction in emissions of nitrogen oxides and particles.

In order to allow separate treatment of late phases of a transient load increase, and to allow a continuous transition to be achieved between steady-state target values and corrections based on the proposed dynamic indicator, provision can be made additionally to "smooth off" over time the trailing edge of the dynamic indicator provided in step 242, using a low pass filter. The dynamic indicator value 310, identified in step 240 and provided in step 242, is firstly checked in a step 320 as to whether or not a negative gradient is present. If not (N), then in step 330 no filtering occurs and the dynamic indicator value 310 is outputted (step 332). If a negative gradient is ascertained, however (J), then in step 340 a PT1 filter is activated, having the present value of the dynamic indicator 310 as an initial value and a time constant dependent on volume or volume gradient. The value thereby modified is outputted as a dynamic indicator value in step 342 and made available, for example, to the EGR system and/or to the boost pressure/injection system controller, or to an e-machine or e-booster. Time smoothing by way of a low pass filter can be useful, for example, when a negative gradient is detected in the dynamic indicator, but a positive gradient is detected in the injection volume (i.e. a further load increase).

The filtering described above can furthermore be used in certain injection volume ranges in order to specially shape the reaction of the indicator, for example in the part-load range.

The method described can be implemented in the form of a control program for an electronic control unit, in particular engine control unit 14 for controlling internal combustion engine 1, or in the form of one or more corresponding control units (ECUs). "Implementing" also means here the implementation of a corresponding program in the control unit.

What is claimed is:

1. A method for detecting and describing a transient driving situation of a motor vehicle having an internal combustion engine having a boost pressure control system or intake manifold pressure control system, the method comprising:
    measuring a boost pressure/intake manifold pressure using a sensor;
    determining a relative boost pressure/intake manifold pressure control deviation using the measured boost pressure/intake manifold pressure;
    determining a dynamic indicator for identifying the transient driving situation from the relative boost pressure/intake manifold pressure control deviation;
    checking if the dynamic indicator has a negative gradient;
    filtering the dynamic indicator if the dynamic indicator has a negative gradient; and
    controlling at least one of an EGR system, a boost pressure/injection system controller, an electrical auxiliary compressor, and an electric motor, using the dynamic indicator.

2. The method of claim 1, wherein a deviation of a target value from an actual value of the boost pressure/intake manifold pressure control system is used as the relative boost pressure/intake manifold pressure control deviation.

3. The method of claim 1, wherein the dynamic indicator is determined from the relative boost pressure/intake manifold pressure control deviation and from a variable characterizing the engine speed.

4. The method of claim 3, wherein the dynamic indicator is a dimensionless variable.

5. The method of claim 3, wherein the filtering includes smoothing off over time a trailing edge in the time course of the dynamic indicator using a low pass filter.

6. The method of claim 5, wherein the low pass filtering is used in a predefinable range of injection volumes.

7. The method of claim 5, wherein the low pass filter is a PT1 filter having a present value of the dynamic indicator as an initial value and a volume-dependent or volume gradient-dependent time constant.

8. A method for detecting and describing a transient driving situation of a vehicle with exclusively pilot-controlled boost pressure, the method comprising:
 measuring a boost pressure using a sensor;
 comparing the measured boost pressure and a reference boost pressure to provide a comparison result; and
 determining a dynamic indicator for identifying the transient driving situation from the comparison result between the present boost pressure and the reference boost pressure;
 checking if the dynamic indicator has a negative gradient;
 filtering the dynamic indicator if the dynamic indicator has a negative gradient and;
 controlling a boost pressure controller using the dynamic indicator.

9. The method of claim 8, wherein environmental corrections are taken into account in the reference boost pressure.

10. The method of claim 1, wherein a quantitative identification of a transient driving situation is carried out based on the value of the dynamic indicator and its behavior over time.

11. A non-transitory computer readable medium having a computer program, which is executable by a processor, comprising:
 a program code arrangement having program code for detecting and describing a transient driving situation of a motor vehicle having an internal combustion engine having a boost pressure control system or intake manifold pressure control system, by performing the following:
 measuring a boost pressure/intake manifold pressure using a sensor;
 determining a relative boost pressure/intake manifold pressure control deviation using the measured boost pressure/intake manifold pressure; and
 determining a dynamic indicator for identifying the transient driving situation from the relative boost pressure/intake manifold pressure control deviation;
 checking if the dynamic indicator has a negative gradient;
 filtering the dynamic indicator if the dynamic indicator has a negative gradient; and
 controlling at least one of an EGR system, a boost pressure/injection system controller, an electrical auxiliary compressor, and an electric motor, using the dynamic indicator.

12. The non-transitory computer readable medium of claim 11, wherein a deviation of a target value from an actual value of the boost pressure/intake manifold pressure control system is used as a relative boost pressure/intake manifold pressure control deviation.

13. An electronic control unit, comprising:
 a control arrangement to detect and describe a transient driving situation of a motor vehicle having an internal combustion engine having a boost pressure control system or intake manifold pressure control system, by performing the following:
 measuring a boost pressure/intake manifold pressure using a sensor;
 determining a relative boost pressure/intake manifold pressure control deviation using the measured boost pressure/intake manifold pressure;
 determining an indicator for identifying the transient driving situation from the relative boost pressure/intake manifold pressure control deviation;
 checking if the dynamic indicator has a negative gradient;
 filtering the dynamic indicator if the dynamic indicator has a negative gradient; and
 controlling at least one of an EGR system, a boost pressure/injection system controller, an electrical auxiliary compressor, and an electric motor, using the dynamic indicator.

14. The method of claim 1, wherein the dynamic indicator is determined from the relative boost pressure/intake manifold pressure control deviation and from a variable characterizing the engine speed, in particular by a two-dimensional characteristics diagram interpolation from a characteristics diagram encompassing the boost pressure/intake manifold pressure deviation and engine speed.

15. The method of claim 3, wherein the dynamic indicator is a dimensionless variable, in particular in the value range between 0 and 1.

16. The method as recited in claim 1, wherein the controlling includes controlling the electrical auxiliary compressor to build up boost pressure.

17. The method as recited in claim 1, wherein the controlling includes triggering the electric motor to build up torque.

18. The method as recited in claim 1, wherein the filtering is not performed when the dynamic indicator does not have a negative gradient.

* * * * *